(12) United States Patent
Hollis et al.

(10) Patent No.: US 6,804,777 B2
(45) Date of Patent: Oct. 12, 2004

(54) SYSTEM AND METHOD FOR APPLICATION-LEVEL VIRTUAL PRIVATE NETWORK

(75) Inventors: Robert L. Hollis, San Antonio, TX (US); J. Marc Enger, San Antonio, TX (US); R. Gunnar Engelbach, San Antonio, TX (US)

(73) Assignee: ThreatGuard, Inc., San Antonio, TX (US)

( * ) Notice: Subject to any disclaimer, the term of this patent is extended or adjusted under 35 U.S.C. 154(b) by 0 days.

(21) Appl. No.: 10/249,877

(22) Filed: May 14, 2003

(65) Prior Publication Data

US 2003/0229786 A1 Dec. 11, 2003

Related U.S. Application Data

(60) Provisional application No. 60/380,727, filed on May 15, 2002.

(51) Int. Cl.[7] .............................. H04L 9/00; H04L 9/32; G06F 11/30; G06F 12/14
(52) U.S. Cl. ........................ 713/170; 713/153; 713/168; 713/200
(58) Field of Search ................................. 713/153, 170, 713/168, 200

(56) References Cited

U.S. PATENT DOCUMENTS

| | | | |
|---|---|---|---|
| 5,604,807 A | | 2/1997 | Yamaguchi et al. |
| 6,272,631 B1 | * | 8/2001 | Thomlinson et al. ........ 713/155 |
| 6,470,450 B1 | * | 10/2002 | Langford et al. ........... 713/182 |

* cited by examiner

*Primary Examiner*—Gilberto Barron
*Assistant Examiner*—Benjamin E. Lanier
(74) *Attorney, Agent, or Firm*—Taylor Russell & Russell, P.C.

(57) ABSTRACT

A method for enabling users to securely share application information and resources by granting resource owners access to user-application combinations. It provides a means for ensuring that only approved and unaltered applications may access available resources. A connection negotiation scheme allows both ends of a communication channel to agree on a specific version of a specific application to be used to access a target resource. Once agreement is reached, a virtual private network channel may be established between approved applications and designated resources that enable channel encryption using an encryption key and a verified signature using a calculated hash value of the negotiated application.

18 Claims, 7 Drawing Sheets

| Connections | Resources |

Application — Using — Status
MyApp.exe — Research DB — Disabled
— 112 — 114

Connection Editor — 110

— 120

Connect Using:
C:\Program Files\MyApp.exe — BROWSE...
— 122 — 130

Connect To:
Research DB ▶

User ID:
John Smith

Password:
********
— 132

ENABLE — 140

FIGURE 1B

| Connections | Resources |

Resource
Research DB
— 124

Resource Name:
Research DB
— 122

Local Port: 1521
— 150

☑ Negotiation Required — 155

Access Authority:
world.usa.ThreatGuard.access.keymaster
— 160

IP Address: — 170          Port: — 172

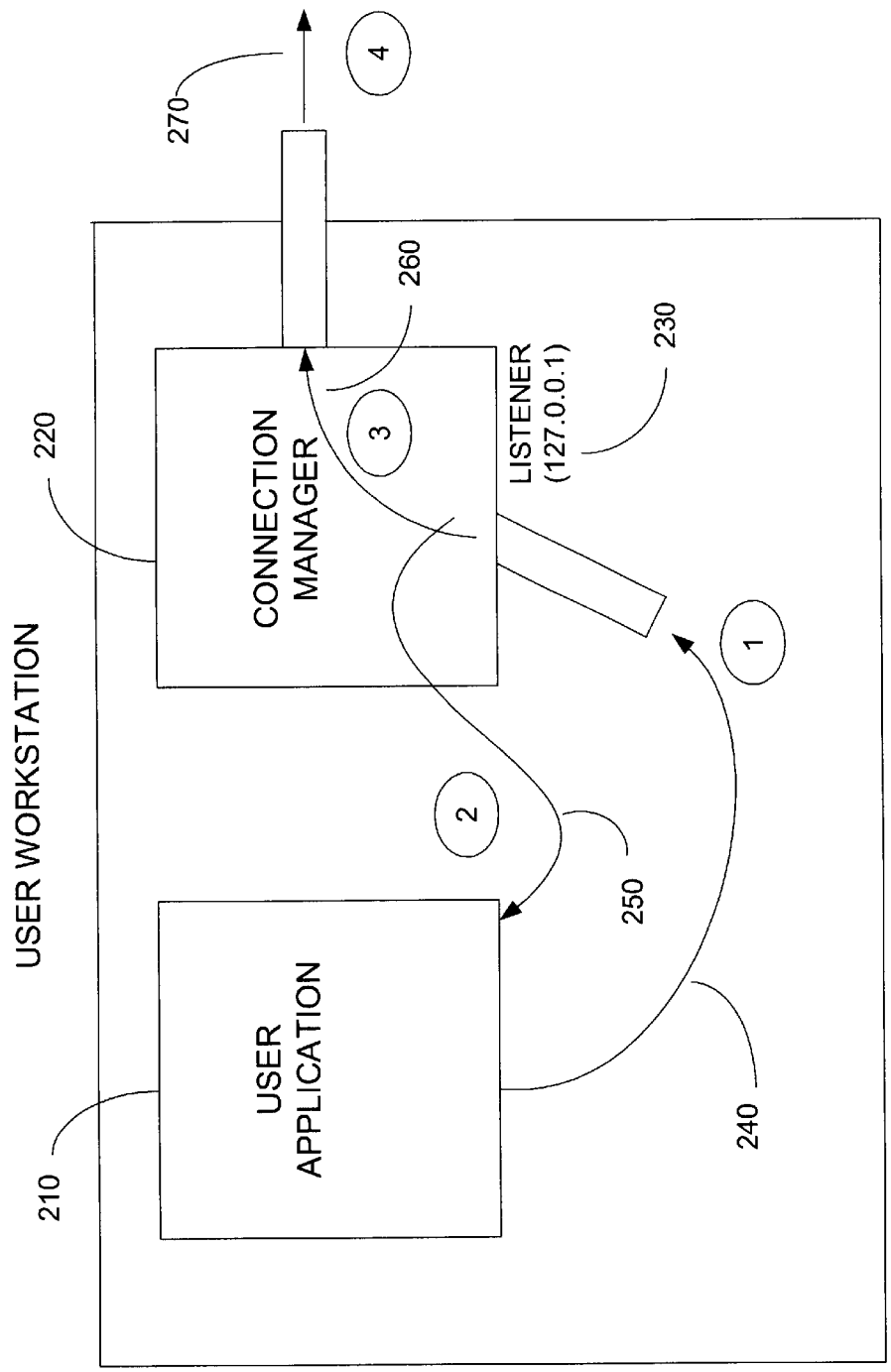

SYSTEM AND METHOD FOR APPLICATION-LEVEL VIRTUAL PRIVATE NETWORK

CROSS REFERENCE TO RELATED APPLICATIONS

This application claims benefit of U.S. Provisional Application No. 60/380,727, filed on May 15, 2002.

BACKGROUND OF INVENTION

The invention relates generally to network security, and more specifically to secure message and file transfers across public or private networks using an application-level virtual private network. It provides a means for specifying and validating the application being used to access a remote resource over a dynamic dedicated secure conduit or tunnel that is established over existing network pathways.

The need for providing and accessing information throughout small and large enterprise organizations spawned rapid a growth in intranets and extranets to satisfy these organizational communications requirements. With the rapid growth of the Internet as a public network communication medium, organizations found substantial cost savings by using the Internet as an worldwide vehicle for providing and accessing organizational information. The result was a shift from closed and protected to open and less secure, open information infrastructure. Gateways were provided to connect existing private networks to the Internet to replace many private dedicated networks providing access to disparate parts of the world. It is not unusual in today's business environment to have multiple computer workstations and servers interconnected by complex and widely dispersed communications networks. These communications networks are critical to many businesses that rely on these information networks to provide services for the day-today operation of their enterprises.

With the growth of these communications networks came an increase in incidences of unauthorized access to these networks by individuals and software programs for accessing confidential information and causing disruptions or irreparable harm to these informational networks. These intrusions, oftentimes resulting in economic losses, have created a demand for means for detecting and preventing malicious and unauthorized access to these networks by users and organizations that seek to find and exploit the smallest security hole. In addition to enterprises instituting safeguards to prevent harm caused to business enterprises and individuals, the government has instituted regulations to protect the privacy of information on individuals that may be available on these information networks.

The Gramm-Leach-Bliley Act requires financial institutions and financial services companies to comply with stringent privacy and security standards. The health care market has similar legislation called the Health Insurance Portability and Accountability Act (HIPAA). While the details of HIPAA are still being completed, it will clearly establish uniform information security standards for health care organizations. Since the late 1980s, the government agencies have been under legislative pressure to secure networked systems. Emerging homeland defense initiatives will add additional and enforceable network security requirements to the government agencies.

In response to unauthorized intrusions into informational networks, various protective measures have been implemented to eliminate or reduce intrusion incidences. Some of these measures include Public Key Infrastructure (PKI) encryption, S/MIME Email security, Secure Sockets Layer (SSL) 128 bit encryption, Virtual Private Network (VPN), firewalls, and vulnerability scanners. Some of these network protection schemes may work at cross-purposes to one another by inhibiting other protection schemes from operating effectively. For example, a firewall may inhibit a vulnerability scanner form assessing the intrusion vulnerability of a system protected by the firewall.

Traditional VPN solutions have typically provided network-to-network secure communications, and machine-to-machine secure communications. In the former case, one network gateway can establish a secure channel to another network's gateway by employing encryption technologies and using the public Internet as a medium. This approach has the benefit of using public resources in a secure manner, but has several notable disadvantages as well. The disadvantages include: (1) all resources on one side of the connection can access all resources on the other side of the connection, unless additional (often overlooked or too restrictive) measures are taken; and (2) if one side of the connection has multiple VPN channels to other locations, all locations can potentially access each other.

Although machine-to-machine VPN solutions seem to address these problems, they still have issues of their own that are often ignored due to the inability of current technologies to address them. The issues include: (1) if an intruder gains access to the one machine in the connection, she can use whatever application is available on the compromised machine to attack resources on the other side of the connection; and if the user of one machine contracts a virus or worm that corrupts his applications, that virus can spread across the VPN to attack resources on the other side of the connection.

SUMMARY OF INVENTION

The present invention provides a solution that overcomes many of the disadvantages and issues encountered in the use of network-to-network VPN secure communications and machine-to-machine VPN secure communications. It enables users to securely share application information and resources by granting resource owners access to user-application combinations, and ensuring that only approved and unaltered applications can access the resources being made available. A process of negotiation is a necessary preamble to any secure connection attempt from an application to a resource. This negotiation allows both ends of a communication channel to agree upon an application and version of an application to be used to access a target resource. Upon agreement by both ends of the communication channel, channel encryption may be established using an encryption key and a signature verified using the hash of the negotiated application.

Each application that runs on a client workstation is subject to a check upon all attempts to use an established application-level VPN channel. This check involves a query to the host operating system to determine which application has requested access and then a calculation of that application's hash. As traffic passes into the VPN channel, the discovered hash and encryption process with a provided session key is used to establish secure communication. As packets emerge on the other side of the channel, the hash of the pre-coordinated application is used as a signature to validate the connection. Therefore, if a rogue or tainted application attempts to use the channel once it has been established, the hash-encryption step will not match the hash-signature step, and communications will not be successful. An embodiment of a network that satisfies these requirements is disclosed in U.S. patent application Ser. No. 10/249,668 filed on Apr. 29, 2003, and incorporated herein by reference.

An embodiment of the present invention is a method for application-level virtual private networking, comprising the steps of requesting access for sending requester messages to an external resource by a requester application within a user workstation, identifying the requestor application and calculating a hash value of the requestor application by a connection manager within the user workstation, forwarding the requestor messages and the calculated application hash value by the connection manager over a network to a channel gateway, receiving the requestor messages and the calculated application hash value by a channel receiver within the channel gateway, authenticating the received requester messages using the calculated application hash value and forwarding the requester messages to the external resource, and receiving the requestor messages by the external resource. The step of requesting access for sending requestor messages to an external resource by a requestor application within a user workstation may comprise the step of requesting access for sending requestor messages to an external server application program within the channel gateway by a requester application within a user workstation, the step of forwarding the requestor messages to the external resource may comprise the step of forwarding the requester messages to an external server application program within the channel gateway, and the step of receiving the requester messages by the external resource may comprise receiving the requester messages by the external server application program within the channel gateway. The step of identifying the requestor application and calculating a hash value of the requestor application by a connection manager within the user workstation may further comprise calculating a hash value of only one specific version of one specific requestor application by a connection manager within the user workstation, and the step of authenticating the received requester messages using the calculated application hash value may comprise authenticating the received requestor messages using the calculated hash value of only the one specific version of the one specific requestor application. The step of identifying the user application may comprise querying a workstation operating system for identifying the user application. The method may further comprise preparing and forwarding response messages by the external resource to the channel receiver within the channel gateway, receiving the response messages by the channel receiver and forwarding the response messages and the calculated application hash value over the network to the connection manager within the user workstation, receiving the response messages by the connection manager, authenticating the received messages using the received calculated application hash value, and forwarding the response messages to the requestor application within the user workstation, and receiving the response messages by the requestor application within the user workstation. The step of authenticating the received response messages using the received calculated application hash value may comprise authenticating the received response messages by comparing the received calculated application hash value with an application hash value calculated by the connection manager. The step of forwarding the requestor messages and the calculated application hash value may comprise the steps of obtaining public and private keys from a PKI authority, encrypting the requestor messages using the external resource public PKI key, encrypting the application hash value and a digital signature, a user ID and a password using the requestor application PKI private key, forwarding the encrypted requestor messages, the application hash value, the digital signature, the user ID and the password by the connection manager over the network to the channel gateway, the step of receiving the requestor messages and the calculated application hash value may comprise receiving the encrypted requestor messages, application hash value, digital signature, user ID and password by the channel receiver of the channel gateway, and the step of authenticating the received requestor messages using the calculated application hash value and forwarding the requester messages to the external resource may comprise decrypting the application hash value, digital signature, user ID and password using the application requestor PKI public key, decrypting the encrypted requestor messages using the external resource PKI private key, authenticating the received requestor messages using the decrypted calculated application hash value, digital signature, user ID and password, and forwarding the decrypted requestor messages to the external resource. The step of receiving the response messages by the channel receiver and forwarding the response messages may comprise receiving the response messages by the channel receiver, encrypting the response messages using the requestor application PKI public key, encrypting the hash and remote source digital signature using the remote source PKI private key, and forwarding the encrypted response messages, the encrypted calculated application hash value and remote resource digital signature, and the requestor application user ID and password over the network to the connection manager within the user workstation, and the step of receiving the response messages by the connection manager may comprise receiving the response messages by the connection manager, decrypting the response messages using the requestor application PKI private key, decrypting the hash and remote source digital signature using the remote source PKI public key, authenticating the decrypted received response messages using the decrypted received calculated application hash value and digital signature, and forwarding the response messages to the requestor application within the user workstation. The method may further comprise the step of forwarding the calculated application hash value, a digital signature, a user ID and a password by the connection manager over the network to an access authority for connection negotiation to obtain a session key, the step of encrypting the requestor messages by the connection manager using the session key, and the step of decrypting the requester messages by the channel receiver using the session key. The method may further comprise the step of negotiating a connection and obtaining a session key from an access authority, the step of encrypting the response messages by the channel receiver using a session key, and the step of decrypting the response messages by the connection manager using the session key. A computer-readable medium may contain instructions for controlling a computer system to implement the method above.

Another embodiment of the present invention is a system for application-level virtual private networking, comprising means for requesting access for sending requestor messages to an external resource by a requestor application within a user workstation, means for identifying the requestor application and calculating a hash value of the requestor application by a connection manager within the user workstation, means for forwarding the requestor messages and the calculated application hash value by the connection manager over a network to a channel gateway, means for receiving the requester messages and the calculated application hash value by a channel receiver within the channel gateway, means for authenticating the received requestor messages using the calculated application hash value and forwarding the requestor messages to the external resource, and means for receiving the requestor messages by the external resource. The external resource may be a server application program. The requester application may be one specific version of one specific application. The system may further comprise means for preparing and forwarding response messages by the external resource to the channel receiver within the channel gateway, means for receiving the response messages by the channel receiver and forwarding the response messages and the calculated application hash value over the network to the connection manager within the user workstation, means for receiving the response messages by the connection manager, authenticating the received messages using the received calculated application hash value, and forwarding the response messages to the requestor application within the user workstation, and means for receiving the response messages by the requester application within the user workstation. The means for forwarding the requestor messages and the calculated application hash value may comprise the steps of obtaining public and private keys from a PKI authority, encrypting the requestor messages using the external resource public PKI key, encrypting the application hash value and a digital signature, a user ID and a password using the requestor application PKI private key, forwarding the encrypted requestor messages, the application hash value, the digital signature, the user ID and the password by the connection manager over the network to the channel gateway, the means for receiving the requestor messages and the calculated application hash value may comprise receiving the encrypted requestor messages, application hash value, digital signature, user ID and password by the channel receiver of the channel gateway, and the means for authenticating the received requestor messages using the calculated application hash value and forwarding the requestor messages to the external resource may comprise decrypting the application hash value, digital signature, user ID and password using the application requester PKI public key, decrypting the encrypted requestor messages using the external resource PKI private key, authenticating the received requestor messages using the decrypted calculated application hash value, digital signature, user ID and password, and forwarding the decrypted requestor messages to the external resource. The means for receiving the response messages by the channel receiver and forwarding the response messages may comprise receiving the response messages by the channel receiver, encrypting the response messages using the requestor application PKI public key, encrypting the hash and remote source digital signature using the remote source PKI private key, and forwarding the encrypted response messages, the encrypted calculated application hash value and remote resource digital signature, and the requestor application user ID and password over the network to the connection manager within the user workstation, and the means for receiving the response messages by the connection manager comprises receiving the response messages by the connection manager, decrypting the response messages using the requestor application PKI private key, decrypting the hash and remote source digital signature using the remote source PKI public key, authenticating the decrypted received response messages using the decrypted received calculated application hash value and digital signature, and forwarding the response messages to the requestor application within the user workstation. The system may further comprise means for forwarding the calculated application hash value, a digital signature, a user ID and a password by the connection manager over the network to an access authority for connection negotiation to obtain a session key, means for encrypting the requestor messages by the connection manager using the session key, and means for decrypting the requestor messages by the channel receiver using the session key. The method may further comprising means for negotiating a connection and obtaining a session key from an access authority, means for encrypting the response messages by the channel receiver using a session key, and means for decrypting the response messages by the connection manager using the session key.

Yet another embodiment of the present invention is a user interface method for application-level virtual private networking, comprising defining a remote resource to be accessed without connection negotiation, including selecting a remote resource to be accessed, designating a local port for accessing a virtual private network, providing an IP address of the remote resource, assigning a port number where the remote resource is available, defining a connection for the requestor application, including using an executable application program for connecting to the remote resource, selecting a remote resource designation, supplying a user ID, entering a password, and clicking an enable button for accessing the remote resource. The user interface method may further comprise defining a remote resource to be accessed with connection negotiation, including checking a box for designating negotiation required, and assigning an access authority to be used and for determining an IP address and remote resource port.

BRIEF DESCRIPTION OF DRAWINGS

These and other features, aspects and advantages of the present invention will become better understood with regard to the following description, appended claims, and accompanying drawings wherein:

FIG. 1 shows a graphical user interface of a Connection Manager for configuring an embodiment of the present invention;

FIG. 2 shows a diagram of a local User Application and a Connection Manager with a Channel Listener for accessing a requested resource according to the present invention;

DETAILED DESCRIPTION

Figure 3A:
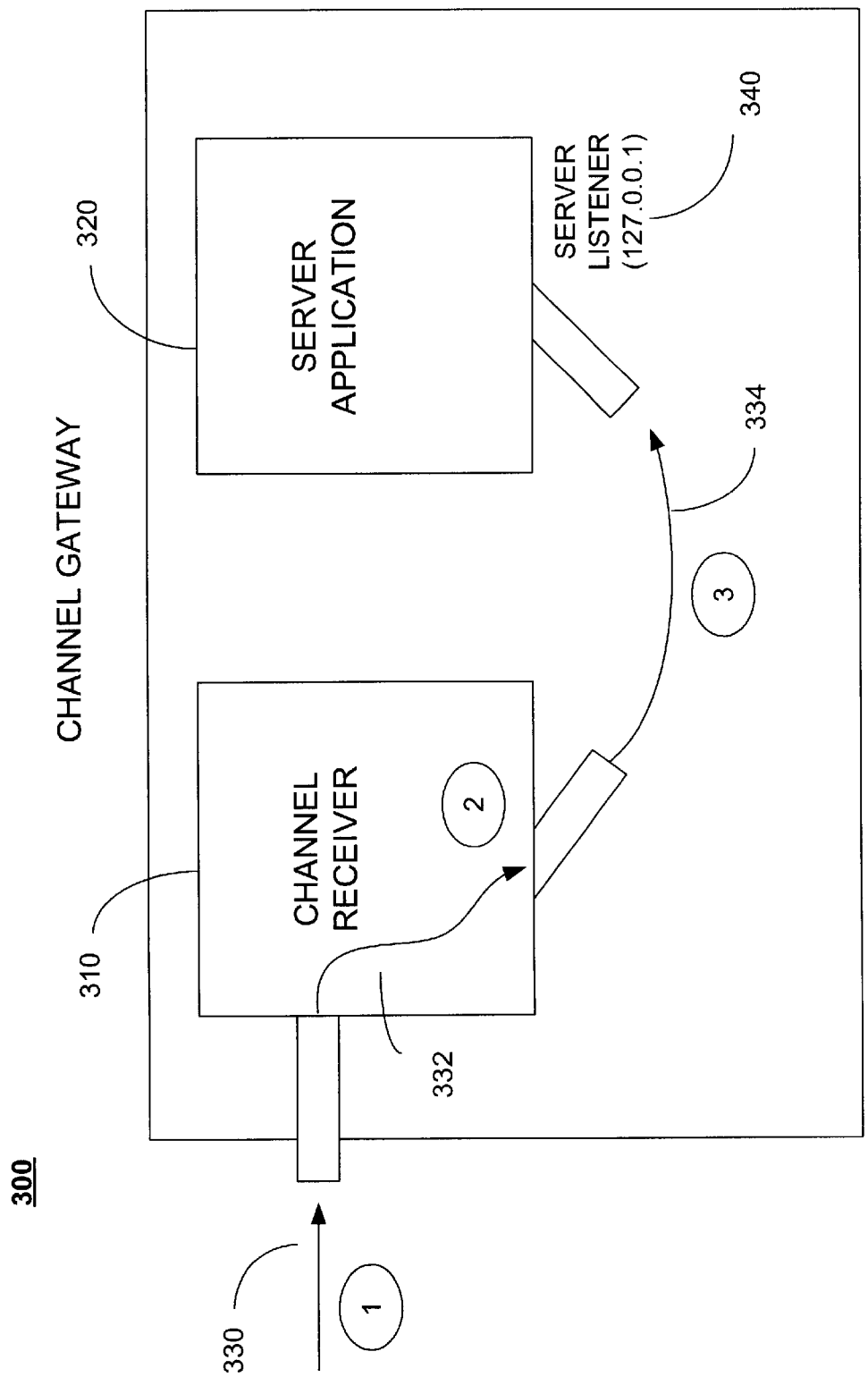
FIG. 3A shows a Channel Gateway on a remote server for processing incoming messages to a server application.

Turning now to FIG. 1, FIG. 1 shows a graphical user interface 100 of a Connection Manager for configuring an embodiment of the present invention. FIG. 1A shows a connection window and FIG. 1B shows a resource window of the user interface 100. When an end-user wants to use a network-aware application 110 to access a protected resource 112, the application 110 must be configured to use resources on a local host rather than a network. For example, if access is desired to a resource oracle database 124 with a resource name Research DB 122, an application configuration must be changed from "my-oracle_server:1521" to "localhost:1521" 150. This configuration can be done manually, or an agent or local library that hijacks specified connections and reroutes them to localhost can handle it. A VPN channel is then configured to accept connections on "localhost:1521" 150 using a graphical user interface such as the one illustrated in FIG. 1. Once the ENABLE button 140 is pressed, the Connection Manager initiates a connection negotiation if it is required by the selected resource. The connection negotiation requires determining the selected application's hash from the operating system, packaging it with the User ID and Password entered for the connection, adding the digital signature from an attached strong authentication device of choice (such as SmartCard, iButton, etc.), and sending the combined message to a specified Access Authority 160. The status 114 of the connection shows a state of "Negotiating" until a response is received from the Access Authority 160. This response includes an approval notice, a session key, and a rendezvous point (IP address: port of an RVP) where the requested resource can be accessed. Once a connection has been approved, the Connection Manager opens a Listener on the local port 150 specified for the connection, and the system is ready to transfer messages.

As shown in FIG. 1, the graphical user interface 100 of the Connection Manager enables a user to define a connection to a remote resource. The remote resource definition includes (1) a resource name 122 as a reference to the remote resource, (2) a local port 150 where local applications connect for access the remote resource, (3) whether negotiation is required 160 to initiate a negotiation sequence with the specified Access Authority 160 when a connection is "Enabled" 114 for this resource, (4) an Access Authority 160 that specifies a Key Authority for access to the remote resource if negotiation is required, (5) an IP address 170 where the remote resource is available (provided by a negotiation process if negotiation is required), and (6) a port number 172 where the remote resource is available (provided by a negotiation process if negotiation is required). A list of resources and resource definitions is stored on a local user file system to enable a user to recall previously defined entries. The graphical user interface 100 enables a user to define a reusable connection. This definition includes (1) a fully qualified executable for connecting to a specified resource 120, (2) a defined resource that is added to a drop-down resource list 122, (3) a user ID 130 to be used in a negotiation process, and (4) a password 132 for use in a negotiation process. The list of connections 122 and each connection definition is stored on a local user file system to enable a user to recall previously defined entries. Once a negotiation process is completed, signified either by approval from an Access Authority 160 or assumed in the case of no required negotiation, the Connection Manager instantiates the Channel Listener on the specified local port 150 and provides a session key from the from the Access Authority 160.

Turning to FIG. 2, FIG. 2 shows a diagram 200 of a local User Application 210 and a Connection Manager 220 with a Channel Listener 230 for accessing a requested resource according to the present invention. The purpose of the Channel Listener 230 is to calculate the hash as a signature of any application that attempts to use its resource, to encrypt all traffic and forward the traffic to the specified resource, and to verify signatures using the application hash and decrypt return traffic. FIG. 2 illustrates how local applications can use the Channel Listener 230 to access a requested resource once the Channel Listener 230 has been started. When a User Application 210 connects to the local resource 240 provided by the Connection Manager 220 and Channel Listener 230, the Channel. Listener 230 performs a hash check of that application 250. This involves some native functions that allow the connection routines to match file descriptors to requesting programs. Once the hash of the User Application program 210 is determined, the Channel Listener 230 uses the program's hash for use as a signature for validating a connection and uses a session key provided by an Access Authority to encrypt all messages 260. The Channel Listener 230 then forwards the encrypted traffic to a specified resource 270.

As shown in FIG. 2, the Channel Listener 230 accepts traffic from the workstation via a loopback address (127.0.0.1) 240. Upon receiving a connection, the Channel Listener 230 interrogates the operating system to identify the requestor of the resource. Once the requestor is known, the Channel Listener 230 calculates a hash of the requestor 250. This hash is used as a signature and a session key is used to encrypt all traffic from the connecting application 260 as the Channel Listener 230 forwards it to the remote resource 270. The Channel Listener 230 opens ports on a local host such that they are not accessible from external sources. Upon accepting a connection, the Channel Listener 230 must determine the requestor of the connection by any accurate means. This can include native languages and operating system dependent methods. Native methods used to fulfill this requirement are modularized such that they can be easily integrated into the Connection Manager 220. Upon identifying a requester, the Channel Listener 230 calculates its hash as it resides on the file system. As traffic passes through the Channel Listener 230, the Channel Listener 230 uses the session key provided by the Connection Manager 220 to encrypt the traffic. The Channel Listener 230 forwards the encrypted traffic to the external resource 270 specified in the Connection Manager 220. The return traffic is decrypted with the same session key and verified with a signature.

Figure 3B:
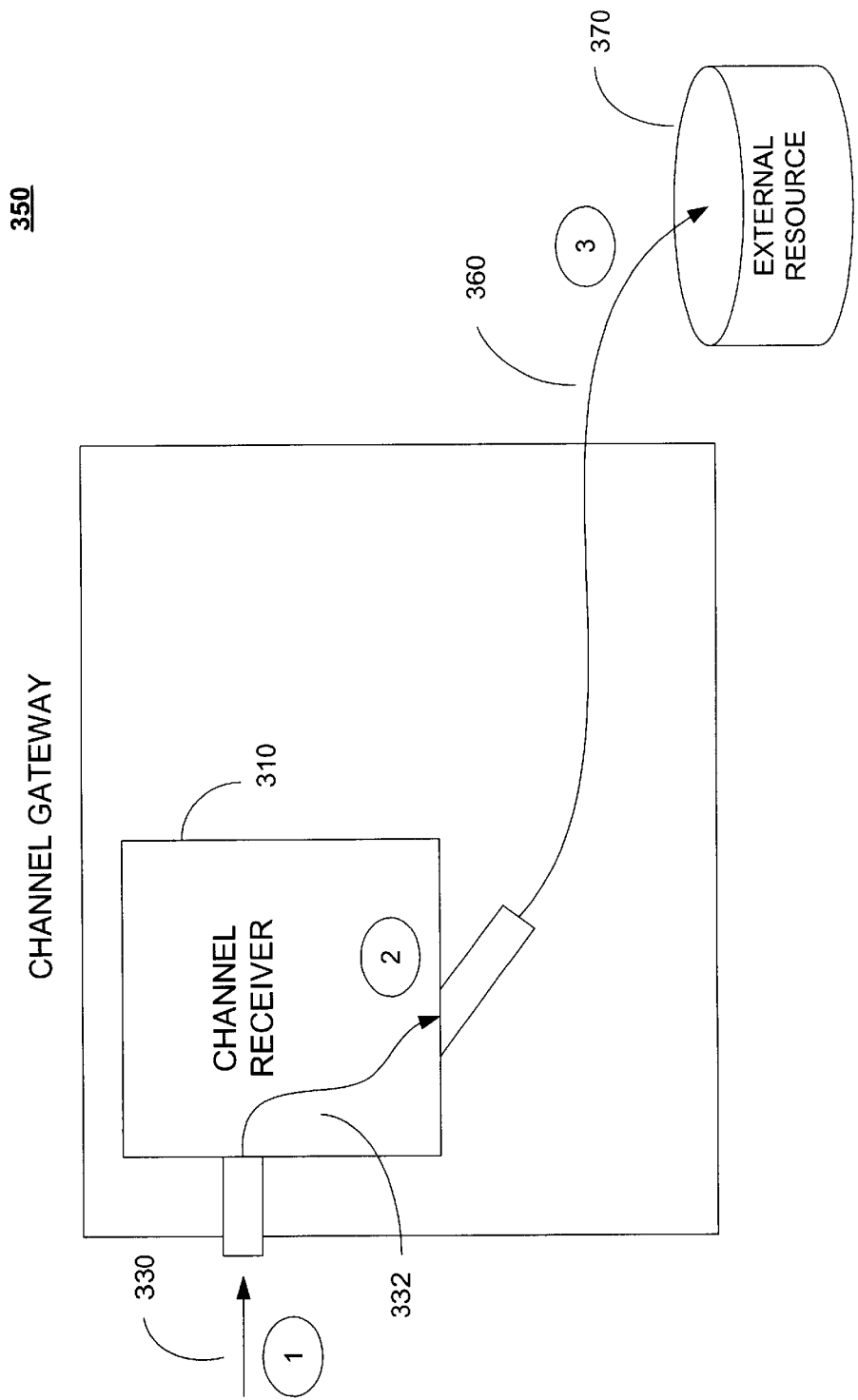
FIG. 3B shows a Channel Gateway on a remote server for processing incoming messages to a resource external to the server.

Turning now to FIG. 3, FIG. 3A shows a Channel Gateway 300 on a remote server for processing incoming messages to a server application and FIG. 3B shows a Channel Gateway 350 on a remote server for processing incoming messages to a resource external to the server. FIG. 3A and FIG. 3B show how the Channel Gateway 300, 350 on a remote server processes incoming message traffic 330. In both cases, the connection negotiation has already occurred, as discussed above, for providing a Channel Receiver 310 with the proper application hash and session key. Similar to the Channel Listener discussed above, which encrypted the traffic with a session key and used the hash as a signature, the Channel Receiver 310 decrypts the incoming message traffic 330 in a comparable manner. The message traffic flows both ways for the users" applications to communicate effectively with the target resources. Therefore, return traffic is encrypted and decrypted such that the Channel Listener and Channel Receiver 310 switch encryption/decryption roles. When communicating 360 with a Channel Receiver 310, an External Resource 370 performs the same message communications functions as a Server Application 320 and a Server Listener 34 communicating 334 with a Channel Receiver 310, similar to the Communication Manager discussed above. Incoming message traffic 330 enters a Channel Gateway 300, 350 via a Channel receiver 310. The Channel Receiver 310 decrypts the message traffic using a session key and verifies a signature using an application hash 332. The Channel Receiver 310 then forwards the decrypted message traffic 334, 360 to a Server listener 340 connected to a Server Application 320, or an external resource 370.

As shown in FIG. 3A and FIG. 3B, the purpose of a Channel Gateway 300, 350 is to provide an environment where a Channel Receiver 310 can operate. The Channel Gateway 300, 350 is a network appliance that serves as the server-side tunnel to the secured resource. It is the platform on which the Channel Receiver 310 runs, and may or may not be the host of the target resource, as shown in FIG. 3A and FIG. 3B. The Channel Gateway 300, 350 is capable of providing a Java Runtime Environment (JRE) in which the Channel Receiver 310 can execute. The Channel Gateway 300, 350 has sufficient processor speed and memory specification to appropriately minimize the latency caused by encryption and decryption. The purpose of the Channel Receiver 310 is to accept network traffic 330, decrypt it using a session key and verify signature authorization using the application hash, and forward it on to the designated resource 334, 360. The Channel Receiver 310 is a network-aware process that opens a service listening for traffic sent from a Connection Manager Channel Listener described above. When initiated, the Channel Receiver 310 is instantiated with a session key and application hash specifying who and what is permitted to connect. This information is used to verify authorized signatures and to decrypt the incoming message stream 330 prior to forwarding it to its ultimate destination 334, 360. The Channel Receiver 310 accepts a session key, application hash, and target resource as part of its instantiation parameters. The key and hash are used to decrypt and verify signatures of all message traffic received from the sending Connection Manager Channel Listener. Decrypted traffic is forwarded to the specified target resource 334, 360. Return message traffic 334, 360 from the target resource 320, 370 is encrypted with the same session key and verified with the application hash. Encrypted return message traffic 330 is forwarded back to the originating Connection Manager Channel Listener described above.

Figure 4:
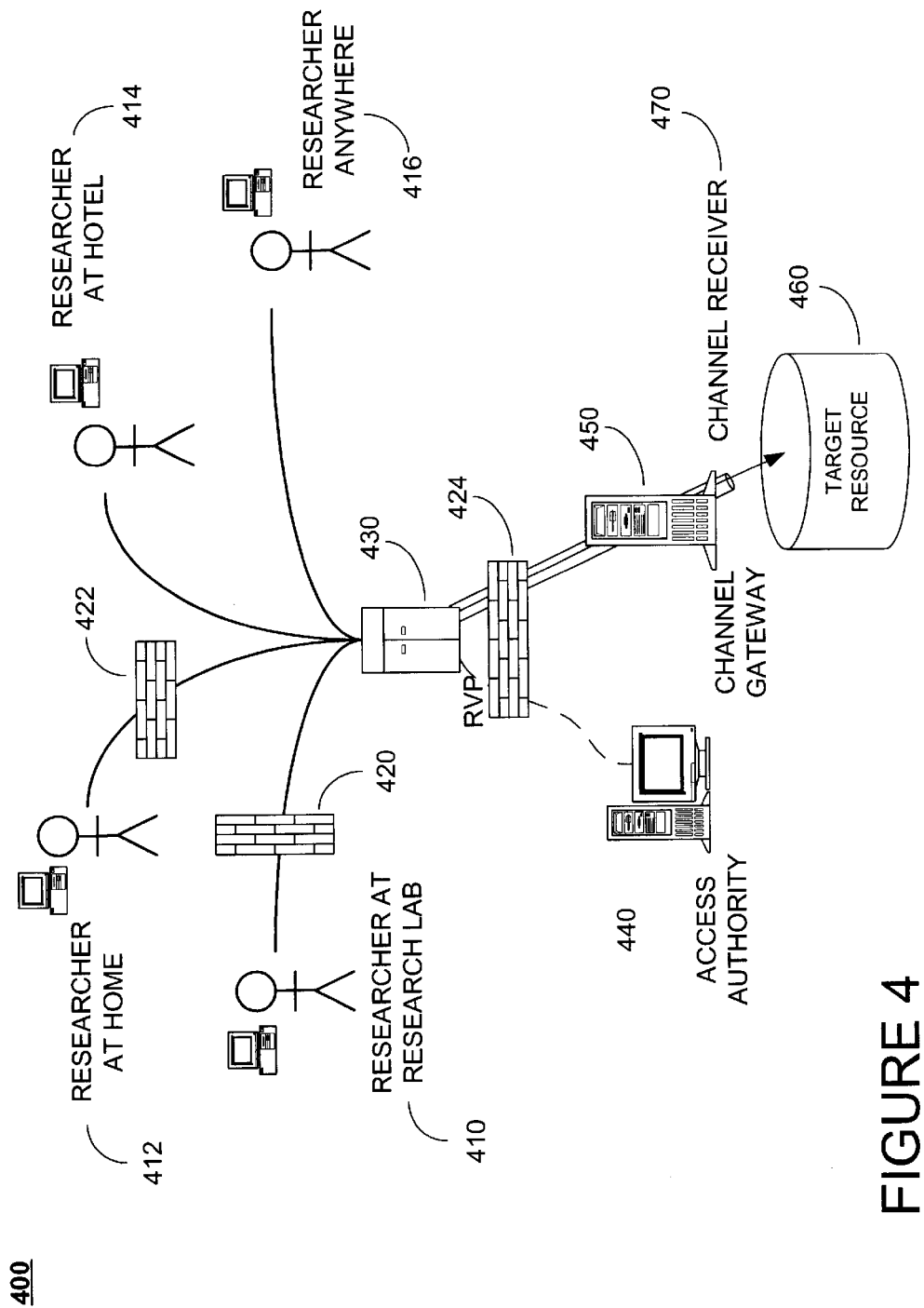
FIG. 4 shows a typical network application of users accessing a target resource.

Turning to FIG. 4, FIG. 4 shows a typical network application 400 of users 410–416 accessing a target resource 460. It shows multiple researchers 410, 412, 414, 416 connecting to a centralized research database 460. Some researchers 410, 412 are connected from a secure network behind a firewall 420, 422. Other researchers 414, 416 are connected from unsecured points on the Internet. Since the target database 460 is protected by its own firewall 424, a connection to it has been forwarded to a public connection point on the Internet. Typically, such a service would pose a high security risk because a user on the Internet would be able to connect to the database 460 through the firewall 424. Using the present invention, traffic does not advance beyond the Channel Gateway 450 to touch the database 460, unless an authorized user-application pair is accessing the resource 460. As discussed above, using a Secure Message-Oriented-Middleware to send and receive the appropriate messages, user can use the Access Authority 440 for Connection Negotiation. The Channel Receiver 470 is the process or library on the Channel Gateway 450 that decrypts incoming traffic and encrypts the return traffic. A user having a qualified application, Connection Manager and Channel Listener shown in FIG. 1, such a researcher anywhere 416, must first obtain a session key for encryption purposes from the Access Authority 440 via the rendezvous peer (RVP) 430. Using the session key to encrypt message traffic and application hash for signature verification, the user 416 connects to the RVP 430 to the Channel Gateway 450 and Channel Receiver 470, as shown in FIG. 3. The Channel Gateway 450 containing the Channel Receiver 470 verifies an authorized signature using the forwarded application hash and decrypts the message traffic using the session key, forwarding the message traffic to the target resource 460. When sending message traffic from the target resource 460 to the researcher 416, the process of signature verification and encryption is reversed, as explained above.

Figure 5:
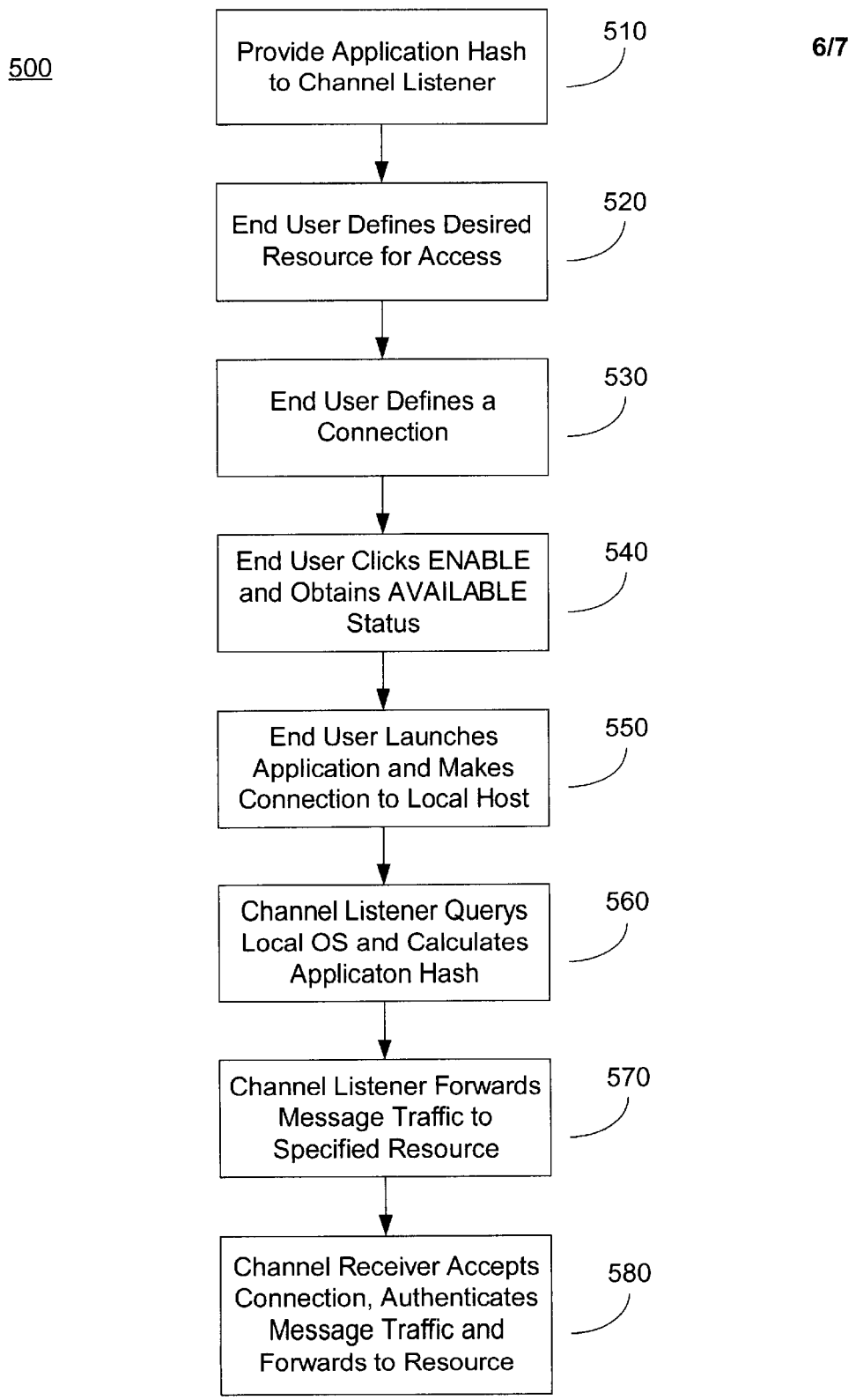
FIG. 5 shows a flow diagram of connecting to a resource that does not require negotiation.

Turning to FIG. 5, FIG. 5 shows a flow diagram 500 of connecting to a resource that does not require negotiation. The predetermined application hash has previously been provided to the Channel Listener 510. This scenario only permits one version of one application to be used to access the protected resource. Furthermore, it does not facilitate the exchange of session keys and is thus not recommended for solutions that need more appropriate security. The end-user defines a resource using the Connection Manager 520 with information similar to this example data:

[t1]
    Resource Name: Research Database
    Local port: 1521
    Negotiation Required: No
    Access Authority: N/A
    IP Address: 192.168.10.100
    Port 1521

The end-user defines a connection using the Connection Manager 530 with information similar to this example data:

[t2]
    Connect Using: C:\Program Files\MyApp.exe
    Connect To: Research Database
    User ID: <userid>
    Password: <password>

The end-user clicks the ENABLE button on the Connection Manager, and the Connection Manager immediately reports the selected connection as AVAILABLE 540. The end-user, having configured his application to connect to localhost:1521 to match the information provided above, launches his application and the application makes a connection to the local host 550 provided by the Channel Listener. The Channel Listener interrogates the local operating system to determine the executable that has connected to the resource, and calculates a hash of that file for use as signature authentication 560. As message traffic passes through the Channel Listener, the hash value calculated from the requestor application is used to authenticate the signature, and the Channel Listener forwards all message traffic to the specified resource 570. The Channel Receiver accepts the connection and authenticates the traffic using the pre-coordinated application hash 580.

Figure 6:
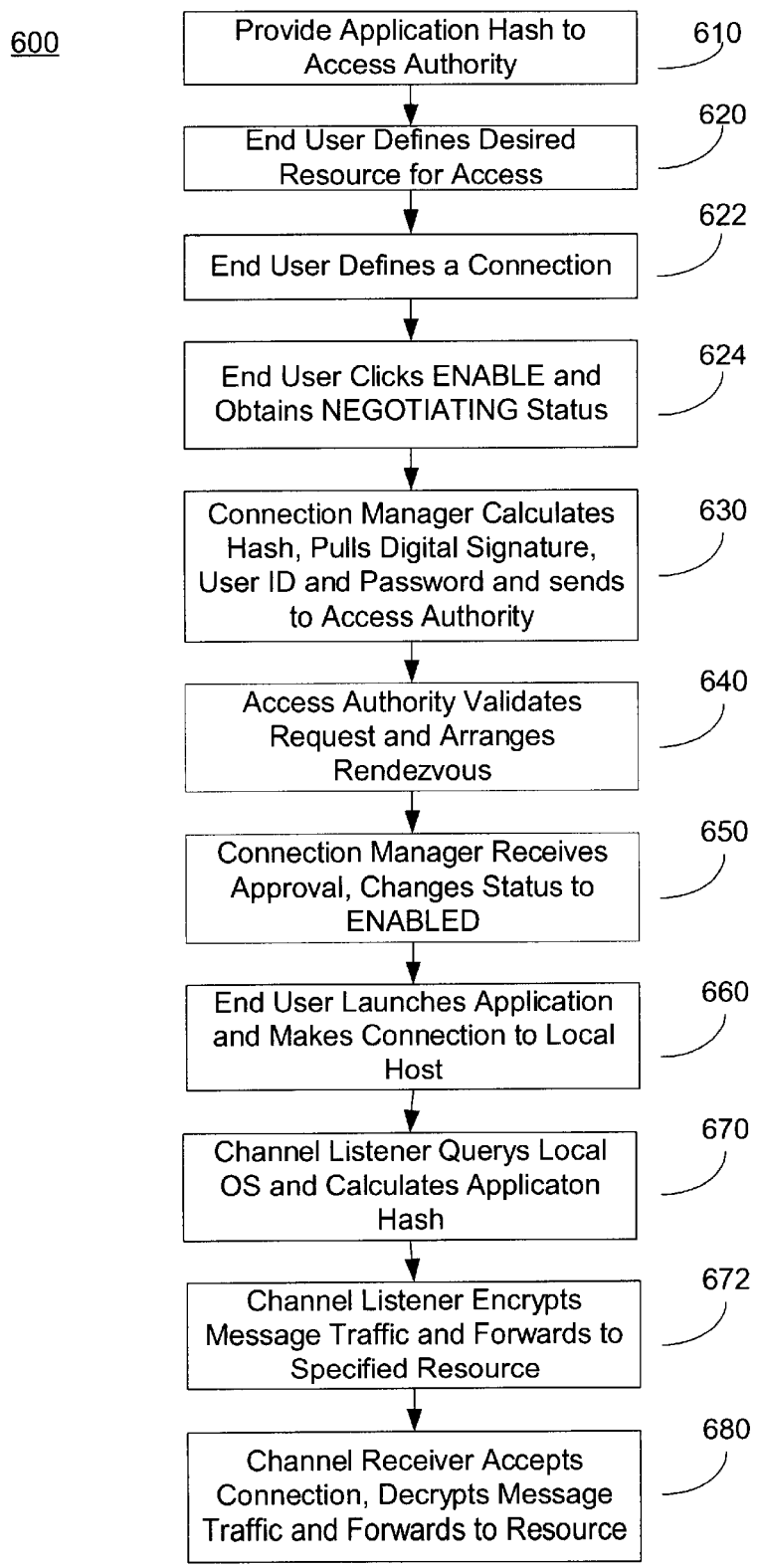
FIG. 6 shows a flow diagram of connecting to a resource that requires negotiation.

Turning to FIG. 6, FIG. 6 shows a flow diagram 600 of connecting to a resource that requires negotiation. The predetermined application hash has previously been provided to the Access Authority 610. The end-user defines a resource using the Connection Manager 620 with information similar to this example data:

[t3]
    Resource Name: Research Database
    Local port : 1521
    Negotiation Required: Yes
    Access Authority: world.usa.ThreatGuard.axess.key-master
    IP Address: N/A
    Port: N/A The end-user defines a connection using the Connection Manager 622 with information similar to this example data:

[t4]
Connect Using: C:\Program Files\MyApp.exe
Connect To: Research Database
User ID: <userid>
Password: <passsword>

The end-user clicks the ENABLE button on the Connection Manager and the Connection Manager reports the status of the selected connection as NEGOTIATING 624. The Connection Manager then calculates the hash of the specified application, pulls the user's digital signature from a local strong authentication device, packages that information with the User ID and password, and sends the message to the specified Access Authority via a Message-Oriented Middleware API 630. The Access Authority validates the request and arranges the rendezvous 640 by generating a session key for the Listener and Receiver to share, instructing the Channel Gateway to open a forwarded tunnel from the RVP to the specified resource, instructing the Channel Receiver of the application hash and session key to use for decryption, and instructing the user's Connection Manager Channel Listener of the session key, as well as the IP address and port on the RVP has been opened by the Channel Gateway to offer the service. Upon receiving approval of the request, the Connection Manager updates the connection status from NEGOTIATING to ENABLED 650. The end-user, having configured his application to connect to localhost:1521 to match the information provided above, launches his application and the application makes a connection to the localhost resource provided by the Channel Listener 660. The Channel Listener interrogates the local operating system to determine the executable that has connected to the resource and calculates a hash of that file for use as signature authentication 670. As traffic passes through the Channel Listener, it is encrypted by the Listener using the provided session key as the encryption key, and the Listener forwards all traffic to the IP address and port provided by the Access Authority 672. The Channel Receiver accepts the connection and decrypts the traffic using the pre-coordinated application hash and session key as the decryption key 680.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for application-level virtual private networking, comprising the steps of:
    requesting access to a connection manager for sending requestor messages over a virtual private network tunneled network connection to an external network resource via a channel receiver by a requestor application within a user workstation;
    identifying and configuring the requestor application to use loopback network address resources on a local host;
    calculating a hash value as a validating signature of the requestor application by a the connection manager within the user workstation;
    forwarding the calculated application hash value, a digital signature, user ID and user password by the connection manager over a persistent tunnel network connection to a key access authority network node to obtain a session key for connection negotiation;
    receiving by the connection manager from the key access authority network node an approval notice, session key, and IP address of a channel gateway where the external network resource is accessed on the network;
    opening a local port, encrypting the calculated hash and requestor messages using a session key, and forwarding the encrypted requestor messages, and the encrypted calculated application hash value, and the session key by the connection manager over a network to a channel receiver in the channel gateway;
    receiving over the network and decrypting the requestor messages and the calculated application hash value using the session key by the channel receiver within the channel gateway;
    authenticating the received requestor messages using the calculated application hash value and forwarding the requestor messages to the external resource;
    receiving the requestor messages by the external resource; and
    returning response messages to the requestor application.

2. The method of claim 1, wherein
    the step of requesting access to a connection manager for sending requestor messages to an external network resource by a requestor application within a user workstation comprises the step of requesting access to a connection manager for sending requestor messages to an external network service within the channel gateway by a requestor application within a user workstation;
    the step of opening a local port and forwarding the encrypted requestor messages to a channel receiver in the channel gateway comprises the step of opening a local port and forwarding the encrypted requestor messages to an external network service within the channel gateway; and
    the step of receiving the requestor messages by the external resource comprises receiving the requestor messages by the server application program within the channel gateway.

3. The method of claim 1, wherein:
    the step of calculating a hash value as a validating signature of the requestor application by the connection manager within the user workstation further comprises calculating a hash value as a validating signature of only one specific version of one specific requestor application by the connection manager within the user workstation; and
    the step of authenticating the received requestor messages using the calculated application hash value comprises authenticating the received requestor messages using the calculated hash value of only the one specific version of the one specific requestor application.

4. The method of claim 1, wherein the step of identifying and configuring the requestor application comprises querying a workstation operating system for identifying the user requestor application.

5. The method of claim 1, wherein the step of returning response messages to the requestor application comprises:
    preparing and forwarding response messages by the external resource to the channel receiver within the channel gateway;
    receiving the response messages by the channel receiver, encrypting the calculated hash and response messages and forwarding the encrypted response messages, the encrypted calculated application hash value, and the session key by the channel receiver over the network to the connection manager within the user workstation;
    receiving and decrypting the response messages and the calculated application hash value using the session key by the connection managers;

authenticating the received response messages using the received calculated application hash value, and forwarding the response messages to the requestor application within the user workstation; and receiving the response messages by the requestor application within the user workstation.

6. The method of claim 5, wherein the step of authenticating the received response messages using the received calculated application hash value comprises authenticating the received response messages by comparing the received calculated application hash value with an application hash value calculated by the connection manager.

7. The method of claim 1, wherein:

the step of opening a local port and forwarding the encrypted requestor messages, the encrypted calculated application hash value, and the session key comprises the steps of obtaining public and private keys from a PKI authority, encrypting the requestor messages using a dynamically generated session key, encrypting the application hash value and a digital signature, a user ID and a password using the requestor application PKI private key, forwarding the encrypted requestor messages, the application hash value, the digital signature, the user ID and the password by the connection manager over the network to the channel gateway;

the step of receiving and decrypting the requestor messages and the calculated application hash value comprises receiving the encrypted requestor messages, application hash value, digital signature, user ID and password by the channel receiver of the channel gateway; and the step of authenticating the received requestor messages using the calculated application hash value and forwarding the requestor messages to the external resource comprises decrypting the application hash value, digital signature, user ID and password using the application requestor session key, decrypting the encrypted requestor messages using the external resource PKI private key, authenticating the received requestor messages using the decrypted calculated application hash value, digital signature, user ID and password, and forwarding the decrypted requestor messages to the external resource.

8. The method of claim 5, wherein:

the step of receiving the response messages by the channel receiver, encrypting the calculated hash and response messages and forwarding the encrypted response messages comprises receiving data streams by the channel receiver, dynamically generating a session key, encrypting the session key with the requestor's public key, signing the session key with the remote resource's private key, encrypting the data streams using the session key, encrypting the hash and a remote source digital signature using the session key, and forwarding the encrypted data streams, the encrypted calculated application hash value and remote resource digital signature, and the requestor application user ID and password over the network to the connection manager within the user workstation; and the step of receiving and decrypting the response messages and the calculated application hash value using the session key by the connection manager comprises receiving the data streams by the connection manager, verifying the signature of the encrypted session key using the remote resource's public key, decrypting the session key using the requestor's private key, decrypting the response messages data streams using the decrypted session key, decrypting the hash and remote source digital signature using the decrypted session key, authenticating the decrypted received data streams using the decrypted received calculated application hash value and digital signature, and forwarding the data streams to the requestor application within the user workstation.

9. The method of claim 5, further comprising:

the step of negotiating a connection and obtaining a session key from an access authority;

the step of encrypting the response messages by the channel receiver using a session key; and the step of decrypting the response messages by the connection manager using the session key.

10. A computer-readable medium containing instructions for controlling a computer system to implement the method of claim 1.

11. A computer-readable medium containing instructions for controlling a computer system to implement the method of claim 5.

12. A system for application-level virtual private networking, comprising:

means for requesting access to a connection manager for sending requestor messages over a virtual private network tunneled network connection to an external network resource via a channel receiver by a requestor application within a user workstation;

means for identifying and configuring the requestor application to use loopback network address resources on a local host;

means for calculating a hash value as a validating signature of the requestor application by the connection manager within the user workstation;

means for forwarding the calculated application hash value, a digital signature, user ID and user password by the connection manager over a persistent tunnel network connection to a key access authority network node to obtain a session key for connection negotiation;

means for receiving by the connection manager from the key access authority network node an approval notice, session key, and IP address of a channel gateway where the external resource is accessed on the network;

means for opening a local port, encrypting the calculated hash and requestor messages using a session key, and forwarding the encrypted requestor messages, the encrypted calculated application hash value, and the session key by the connection manager over a network to a channel receiver in a channel gateway;

means for receiving over the network and decrypting the requestor messages and the calculated application hash value using the session key by the channel receiver within the channel gateway;

means for authenticating the received requestor messages using the calculated application hash value and forwarding the requestor messages to the external resource;

means for receiving the requestor messages by the external resource; and means for returning response messages to the requestor application.

13. The system of claim 12, wherein the external resource is an external network service.

14. The system of claim 12, wherein the requestor application is one specific version of one specific application.

15. The system of claim 12, wherein the means for returning response messages to the requestor application comprises:

means for preparing and forwarding response messages by the external resource to the channel receiver within the channel gateway;

means for receiving the response messages by the channel receiver, encrypting the calculated hash and response messages and forwarding the encrypted response messages, the encrypted calculated application hash value, and the session key by the channel receiver over the network to the connection manager within the user workstation;

means for receiving and decrypting the response messages and the calculated application hash value using the session key by the connection manager;

means for authenticating the received response messages using the received calculated application hash value, and forwarding the response messages to the requestor application within the user workstation; and means for receiving the response messages by the requestor application within the user workstation.

16. The system of claim 12, wherein:

means for opening a local port and forwarding the encrypted requestor messages, the encrypted calculated application hash value, and the session key comprises the steps of obtaining public and private keys from a PKI authority, encrypting the requestor messages using a dynamically generated session key, encrypting the application hash value and a digital signature, a user ID and a password using the requestor application PKI private key, forwarding the encrypted requestor messages, the application hash value, the digital signature, the user ID and the password by the connection manager over the network to the channel gateway;

means for receiving and decrypting the requestor messages and the calculated application hash value comprises receiving the encrypted requestor messages, application hash value, digital signature, user ID and password by the channel receiver of the channel gateway; and means for authenticating the received requestor messages using the calculated application hash value and forwarding the requestor messages to the external resource comprises decrypting the application hash value, digital signature, user ID and password using the application requestor session key, decrypting the encrypted requestor messages using the external resource PKI private key, authenticating the received requestor messages using the decrypted calculated application hash value, digital signature, user ID and password, and forwarding the decrypted requestor messages to the external resource.

17. The system of claim 15, wherein:

means for receiving the response messages by the channel receiver, encrypting the calculated hash and response messages and forwarding the encrypted response messages comprises receiving data streams by the channel receiver, dynamically generating a session key, encrypting the session key with the requestor's public key, signing the session key with the remote resource's private key, encrypting the data streams using the session key, encrypting the hash and a remote source digital signature using the session key, and forwarding the encrypted data streams, the encrypted calculated application hash value and remote resource digital signature, and the requestor application user ID and password over the network to the connection manager within the user workstation; and means for receiving and decrypting the response messages and the calculated application hash value using the session key by the connection manager comprises receiving the data streams by the connection manager, verifying the signature of the encrypted session key using the remote resource's public key, decrypting the session key using the requestor's private key, decrypting the response messages data streams using the decrypted session key, decrypting the hash and remote source digital signature using the decrypted session key, authenticating the decrypted received data streams using the decrypted received calculated application hash value and digital signature, and forwarding the data streams to the requestor application within the user workstation.

18. The method of claim 15, further comprising:

means for negotiating a connection and obtaining a session key from an access authority;

means for encrypting the response messages by the channel receiver using a session key; and means for decrypting the response messages by the connection manager using the session key.

* * * * *